(12) United States Patent
Buerk et al.

(10) Patent No.: US 9,055,091 B2
(45) Date of Patent: Jun. 9, 2015

(54) ADAPTIVE TIMING OF DISTRIBUTED DEVICE RESPONSE TO MAXIMIZE CHANNEL CAPACITY UTILIZATION

(71) Applicant: LabTech LLC, Tampa, FL (US)

(72) Inventors: Gregory Francis Buerk, Whitehouse, OH (US); Joshua James Bucher, Swanton, OH (US)

(73) Assignee: Labtech, LLC, Tampa, FL (US)

( * ) Notice: Subject to any disclaimer, the term of this patent is extended or adjusted under 35 U.S.C. 154(b) by 337 days.

(21) Appl. No.: 13/678,326

(22) Filed: Nov. 15, 2012

(65) Prior Publication Data
US 2013/0124730 A1  May 16, 2013

Related U.S. Application Data

(60) Provisional application No. 61/560,431, filed on Nov. 16, 2011.

(51) Int. Cl.
*G06F 15/173* (2006.01)
*H04L 29/08* (2006.01)
*H04L 29/06* (2006.01)

(52) U.S. Cl.
CPC ............ *H04L 67/14* (2013.01); *H04L 69/28* (2013.01)

(58) Field of Classification Search
CPC .............................. H04L 67/14; H04L 69/28
USPC .................... 709/225, 217, 219, 202
See application file for complete search history.

(56) References Cited

U.S. PATENT DOCUMENTS

| | | | |
|---|---|---|---|
| 4,642,758 A | 2/1987 | Teng | |
| 5,831,662 A | 11/1998 | Payton | |
| 6,009,473 A | 12/1999 | Lowe | |
| 6,115,745 A | 9/2000 | Berstis et al. | |
| 6,424,993 B1 | 7/2002 | Weber | |
| 6,751,729 B1 | 6/2004 | Giniger et al. | |
| 6,968,379 B2 | 11/2005 | Nielsen | |
| 7,088,736 B2 | 8/2006 | Altenbernd et al. | |
| 7,161,907 B2 | 1/2007 | Mott | |
| 7,440,452 B1 | 10/2008 | Giniger et al. | |
| 7,558,862 B1 | 7/2009 | Tyukasz et al. | |

(Continued)

OTHER PUBLICATIONS

LabTech, LabTech Software Announces Release of LabTech 2010.2, Nov. 18, 2010, Tampa, Florida.

(Continued)

*Primary Examiner* — June Sison
(74) *Attorney, Agent, or Firm* — Foley and Lardner LLP; John D. Lanza (57) ABSTRACT

Embodiments of systems and methods for providing access to a server by remote devices are shown. In some embodiments, the system includes a scheduling module, a connection module, and/or a timer module. The scheduling module may compute a timer period and timer offset for each remote device on the server to facilitate evenly distributing connections by remote devices and avoid exceeding the maximum bandwidth of the communication channel. The connection module may initiate a connection from each remote device to the server to retrieve the timer period and timer offset. The timer module on each remote device may be controlled by the timer period and timer offset, and trigger the initiation of the connection module. A remote device's status may be offline if the initiation of the connection falls outside a tolerance window corresponding to the timer period and timer offset.

16 Claims, 8 Drawing Sheets

(56) References Cited

U.S. PATENT DOCUMENTS

| | | |
|---|---|---|
| 7,580,972 B2 | 8/2009 | Jones et al. |
| 7,620,707 B1 | 11/2009 | Sutherland et al. |
| 7,734,799 B1 | 6/2010 | Anka |
| 7,765,316 B1 | 7/2010 | Huckins |
| 7,814,190 B2 | 10/2010 | Kacin et al. |
| 7,818,427 B2 | 10/2010 | Kacin et al. |
| 7,827,547 B1 | 11/2010 | Sutherland et al. |
| 7,890,615 B2 | 2/2011 | Kacin et al. |
| 7,912,976 B2 | 3/2011 | Guthrie et al. |
| 7,941,599 B2 | 5/2011 | Kacin et al. |
| 7,984,143 B2 | 7/2011 | Sullivan |
| 8,042,169 B2 | 10/2011 | Logigan et al. |
| 8,086,740 B2 | 12/2011 | Tyukasz et al. |
| 8,103,751 B2 | 1/2012 | Kacin et al. |
| 8,140,748 B2 | 3/2012 | Kacin et al. |
| 8,161,162 B1 | 4/2012 | Sutherland et al. |
| 8,195,797 B2 | 6/2012 | Sullivan |
| 8,200,794 B1 | 6/2012 | Sutherland et al. |
| 8,214,476 B2 | 7/2012 | Sullivan |
| 8,271,637 B2 | 9/2012 | Sutherland et al. |
| 8,571,931 B2 | 10/2013 | Riedl et al. |
| 2004/0024869 A1* | 2/2004 | Davies ............... 709/224 |
| 2005/0135410 A1* | 6/2005 | Stephens ............ 370/449 |
| 2007/0147332 A1* | 6/2007 | Lappetelainen et al. ...... 370/346 |
| 2007/0230421 A1 | 10/2007 | Roadknight |
| 2008/0091773 A1* | 4/2008 | Hameen-Anttila ........... 709/203 |
| 2008/0120210 A1 | 5/2008 | Leventhal |
| 2008/0307318 A1 | 12/2008 | Sullivan |
| 2008/0313231 A1 | 12/2008 | Kloba |
| 2009/0059950 A1* | 3/2009 | Gao et al. ............ 370/449 |
| 2009/0204666 A1 | 8/2009 | Sana et al. |
| 2009/0305778 A1 | 12/2009 | Yu et al. |
| 2010/0064299 A1 | 3/2010 | Kacin et al. |
| 2010/0100778 A1 | 4/2010 | Sullivan |
| 2010/0106842 A1* | 4/2010 | Cosmadopoulos et al. .. 709/228 |
| 2010/0127881 A1 | 5/2010 | Schechter et al. |
| 2010/0214942 A1* | 8/2010 | Du et al. ............ 370/252 |
| 2010/0223368 A1 | 9/2010 | Runcie et al. |
| 2010/0241736 A1 | 9/2010 | Anka |
| 2010/0250681 A1* | 9/2010 | Van Wely ............ 709/206 |
| 2011/0078676 A1 | 3/2011 | Sutherland et al. |
| 2011/0145056 A1 | 6/2011 | Sullivan et al. |
| 2012/0064875 A1 | 3/2012 | Miller |
| 2012/0064880 A1 | 3/2012 | Miller |
| 2012/0096172 A1 | 4/2012 | Tyukasz et al. |
| 2012/0110173 A1* | 5/2012 | Luna et al. .......... 709/224 |
| 2012/0124185 A1 | 5/2012 | Kacin et al. |
| 2012/0131095 A1* | 5/2012 | Luna et al. .......... 709/203 |
| 2012/0170569 A1* | 7/2012 | Al-Khudairi ........ 370/346 |
| 2012/0191802 A1 | 7/2012 | Rodrigues |
| 2012/0191828 A1 | 7/2012 | Rodrigues |
| 2012/0191829 A1 | 7/2012 | Rodrigues |
| 2012/0198044 A1 | 8/2012 | Sutherland et al. |
| 2012/0246479 A1 | 9/2012 | Sutherland et al. |
| 2013/0091193 A1* | 4/2013 | Nachtrab et al. ......... 709/202 |

OTHER PUBLICATIONS

LabTech, LabTech Software Releases Newest, Fastest Version of Its Worldwide Leading Remote Monitoring and Management Solution, Oct. 5, 2011, Tampa, Florida.

LabTech, Most Powerful RMM and Automation Solution for MSPs Gets Even Better, Jun. 14, 2010, Toledo, Ohio.

Office Action on U.S. Appl. No. 13/647,975 dated Dec. 4, 2014.

Notice of Allowance on U.S. Appl. No. 13/647,975 dated Mar. 13, 2015.

* cited by examiner

Fig. 8 ents, the system includes a timer module configured to control the connection module. The timer module may initiate the connection with a period corresponding to the timer period and an offset corresponding to the timer offset.

ADAPTIVE TIMING OF DISTRIBUTED DEVICE RESPONSE TO MAXIMIZE CHANNEL CAPACITY UTILIZATION

CROSS-REFERENCE TO RELATED PATENT APPLICATIONS

The present application claims priority to and the benefit of U.S. Provisional Patent Application No. 61/560,431, filed Nov. 16, 2011 entitled "Adaptive Timing of Distributed Agent Response to Maximize Channel Capacity Utilization," the contents of which is incorporated by reference in its entirety.

TECHNICAL FIELD

The present invention generally relates to autonomous polling of a server by remote devices, and more specifically to reducing the peak bandwidth used by that polling. The reduction is achieved by efficiently scheduling polling activities.

BACKGROUND OF THE INVENTION

With the rapidly expanding use of online services, the pervasiveness of network connectivity, and the increasing speed of networks, it is becoming more and more common for computing devices to rely on networked resources for their operation. For example, resources may provide updates automatically. The networked resources may notify the connected devices when updates are available, and of various operational information.

A resource may provide notifications by connecting to a device via the network. For example, devices may poll the resource periodically to check to see if a notification is available. This sort of polling may generate a large amount of network traffic at the resource, most of which is wasted since notifications are rare relative to the amount of polling.

SUMMARY OF THE INVENTION

Systems and methods of the present disclosure can reduce the peak bandwidth in an environment where remote devices are polling a shared networked resource. The system can maintain high overall security and integrity, while providing scalability to a large numbers of remote devices. For example, systems and methods of the present disclosure may evenly distribute connections from one or more remote devices to a shared network resource. The connections may be distributed according to a minimum period based on at least one of a maximum bandwidth of a communication channel, the average communication data size, and the number of remote devices.

In some aspects, the present invention is directed to a system for providing periodic access to a server by one or more remote devices. In some embodiments, the system includes a scheduling module. The scheduling module may execute on a server. The scheduling module may be configured to compute a timer period and timer offset for each of one or more remote devices. In some embodiments, the system includes a connection module. The connection module may execute on one or more remote devices. The connection module may be configured to initiate a connection from a remote device to a server and retrieve a timer period and timer offset. In some embodiments, the system may include a timer module. The timer module may execute on one or more remote devices. The timer module may be configured to control the connection module to cause the initiation of a connection, with a period set by the timer period and an offset set by the timer offset.

In some aspects, the present invention is directed to a method for providing periodic access to a server by one or more remote devices. In some embodiments, the method includes computing a timer period and timer offset for one or more remote devices. The timer period and timer offset may be computed by a server. In some embodiments, the method includes connecting from one or more remote devices to a server and retrieving a timer period and timer offset. The connecting and retrieving may be done by one or more remote devices. In some embodiments, the method includes initiating a connection to a server with a period set by a timer period and an offset set by a timer offset. The initiation by be done by one or more remote devices.

In some aspects, the present invention is directed to a system for providing periodic access to a server by one or more remote devices. In some embodiments, the system includes a connection module executing on a remote device. The connection module may be configured to initiate a connection from the remote device to the server. The connection module may receive, responsive to the initiation of the connection, a timer period and a timer offset. In some embodiments, the system includes a timer module configured to control the connection module. The timer module may initiate the connection with a period corresponding to the timer period and an offset corresponding to the timer offset.

In some aspects, the present invention is directed to a method of providing periodic access to a server by one or more remote devices. The method may include connecting, by a remote device, to a server. The method may include retrieving a timer period and a timer offset. In some embodiments, the method includes initiating a connection to the server in response to a period and an offset. The period and offset may correspond to the timer period and timer offset.

In some aspects, the present invention is directed to a system for providing periodic access to a server by one or more remote devices. The system may include a scheduling module, executing on the server. The server may be configured to compute a timer period and a timer offset for one or more remote devices. The server may transmit the timer period and timer offset to the one or more remote devices. In some embodiments, the server is configured to transmit the timer period and timer offset responsive to receiving a first initiation connection. In some embodiments, the server is configured to receive a plurality of initiation connections with a period and offset corresponding to the timer period and timer offset.

In some aspects, the present invention is directed to a method for providing periodic access to a server by one or more remote devices. In some embodiments, the method includes computing a timer period and a timer offset for one or more remote devices. In some embodiments, the method includes transmitting the timer period and timer offset. The timer period and timer offset may be transmitted responsive to receiving an initiation connection. In some embodiments, the method includes receiving a plurality of initiation connections. The initiation connections may be received from one or more remote devices and may have a period and offset corresponding to the timer period and timer offset.

DETAILED DESCRIPTION

Systems and methods of the present disclosure facilitate autonomous polling of a server by remote devices. In some embodiments, a system adapts the timing and/or scheduling of responses and/or connection initiations between a remote device and a shared network resource to maximize channel capacity utilization. In an illustrative example, a shared network resource may refer to a cloud computing resource and remote devices may refer to mobile computing devices. Remote devices may periodically poll the shared network resource to identify a notification, receive updated data, transmit data, etc. To facilitate evenly distributing the connections and avoid exceeding a predetermined bandwidth of the network, the system may identify a timer period based on the number of remote devices, average communication data size, and the capacity of the network. For example, the minimum timer period may be determined by dividing the load on the communication channel (bytes/update cycle) by the capacity of the channel (bytes/second). If there are 10,000 remote devices and the average communication data size per update cycle is 500 bytes, then the load on the channel per update cycle is 5,000,000 bytes/update cycle. If the channel is 1 Mb/s, the capacity of the channel is 125,000 bytes/second. Therefore, the minimum timer period may be 5,000,000 (bytes/update cycle)/125,000 (bytes/second)=40 seconds/update cycle. Further to this example, setting the minimum timer period to 40 seconds may avoid exceeding a maximum bandwidth of 1 Mb/s of the network.

In some embodiments, the connections may be evenly distributed during the timer period based on a timer offset. A timer offset may facilitate scheduling the connections made by remote devices such that multiple remote devices are not simultaneously attempting to connect to the shared network resource, (e.g., delta time=$T_{offset}$*(device_no-1)). For example, if the period is 40 seconds and there are 10,000 devices, the timer offset may correspond to 0.004 seconds (40 seconds/10,000 devices). A first device may initiate a connection at a first time, a second device may initiate a connection at a first time+0.004 seconds, a third device may initiate a connection at a first time+0.008 seconds, etc. Therefore, setting a timer period and timer offset may facilitate avoiding exceeding the maximum capacity of the network and evenly distributing connections.

In some embodiments, systems and methods of the present disclosure may use standard protocols that have been in use since the early days of TCP, which may be built into network security tools. The present invention does not require firewall configurations that allow incoming connections to the remote devices. The present invention scales itself automatically when additional remote devices are added to the system, reducing the amount of work needed to administer the system.

Figure 1:
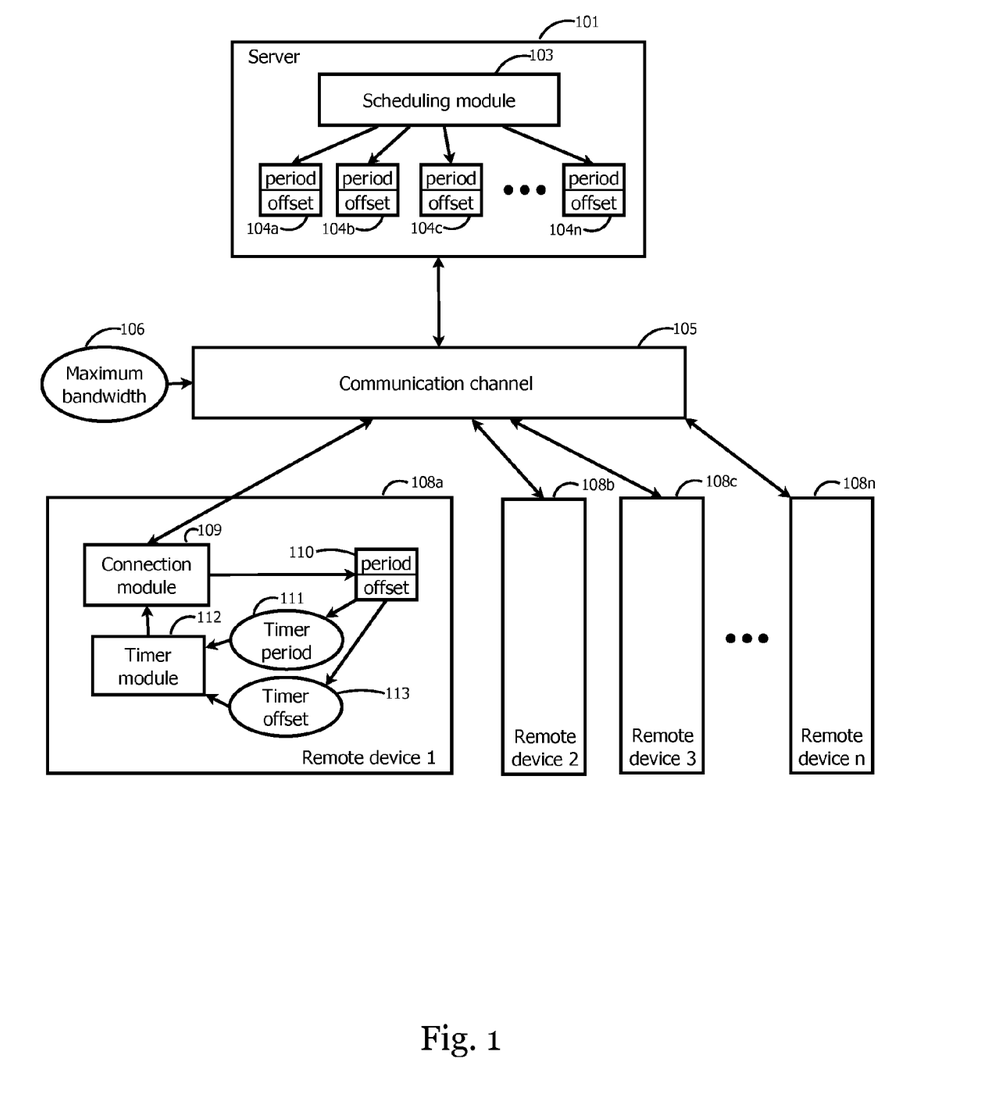
FIG. 1 is an illustrative block diagram of one embodiment of a system for providing periodic access to a server by one or more remote devices.

Referring now to FIG. 1, an illustrative block diagram of one embodiment of a system for providing periodic access to a server 101 by one or more remote devices 108a-108n is shown. In brief overview, in some embodiments, remote devices 108a-108n communicate with the server 101 through a communication channel 105. The system may include a connection module 109 that initiates a communication. The communication channel 105 may be configured to support a maximum bandwidth 106. When the total data rate between the remote devices 108a-108n and the server 101 exceeds this maximum bandwidth 106, the communication channel 105 may be configured to reduce the rate at which the connections are used.

In further detail, in some embodiments, the server 101 may include multiple, logically-grouped servers and may be referred to as a server farm. In some embodiments, the server 101 may include servers that are geographically dispersed. The server farm may be managed by a single entity. In some embodiments, the servers within each machine farm can be heterogeneous—one or more servers of server 101 can operate according to one type of operating system platform (e.g., WINDOWS NT, manufactured by Microsoft Corp. of Redmond, Wash.), while one or more of the other servers can operate on according to another type of operating system platform (e.g., Unix, Linux, or Mac OS X manufactured by Apple Computer Corp. of Cupertino, Calif.). The server 101 may include a file server, application server, web server, proxy server, appliance, network appliance, gateway, gateway server, virtualization server, deployment server, SSL VPN server, or firewall.

In some embodiments, the server 101 includes a scheduling module 103 designed and constructed to facilitate the computation of a timer period and/or a timer offset for at least one remote device. In some embodiments, the scheduling module 103 may determine a timer offset based, at least in part, on the maximum bandwidth 106, number of remote devices 108a-108n, and/or the average communication data size. The scheduling module 103 may comprise of various hardware and/or software components including, e.g., an application, program, library, script, service, process, task or any other type and form of executable instructions executing on the server 101.

In some embodiments, the scheduling module 103 computes a timer period based, at least in part, on the maximum bandwidth 106 of the communication channel. In some embodiments, the scheduling module 103 computes the timer period based on a desired utilization of the communication channel 105. For example, the maximum bandwidth 106 of the communication channel 105 may be 1 Mb/s while a desired utilization of the communication channel 105 may be 90% of the maximum bandwidth 106, or 85%, 80%, 75% or any other percentage to facilitate operation of the system.

In some embodiments, the server 101 may be configured to identify the maximum bandwidth 106 of the communication channel. For example, the server 101 may transmit and/or receive a test communication to determine the rate at which the communication is transmitted and/or received. In other embodiments, the server 101 may modify the maximum bandwidth 106 value used for computing the timer period and/or timer offset based on historical network data. In other embodiments, the server 101 may provide a user interface to allow an end user to set the maximum bandwidth. In other embodiments, the server 101 may retrieve the maximum bandwidth from a third-party service that measures throughput of various network segments.

In some embodiments, the scheduling module 103 computes a timer period based, at least in part, on the number of devices (e.g., number of currently active remote devices) that may initiate a connection with the server during a given time interval. The number of remote devices may refer to a predetermined maximum number of remote devices. For example, an entity may issue 10,000 remote devices to its employees and, therefore, set the number of remote devices to 10,000. In some embodiments, the system may identify the number of remote devices based on historical connection requests. For example, the system may identify the maximum number of remote devices that initiated a connection in the previous timer period, 1 minute, 5 minutes, 30 minutes, 60 minutes, 12 hours, 24 hours, or any other time period. In some embodiments, the system may identify the number of active remote devices at a given time based on a connection.

In some embodiments, the scheduling module 103 computes a timer period based, at least in part, on an average communication data size. A communication may include any type of data. The communication data size may vary from remote device to remote device or connection to connection based on the function of the remote device and/or server. The scheduling module 103 may identify the communication data size based on historical communication data sizes. For example, the scheduling module 103 may be configured to take a running average of the communication data sizes in substantially real-time or each time the scheduling module 103 computes a timer period and/or timer offset. In some embodiments, the scheduling module 103 may periodically compute the average communication data size; e.g., every 1 minute, 5 minutes, 10 minutes, 30 minutes, hourly, every 12 hours, daily, etc. An exemplary communication data size may be 100 bytes, 200 bytes, 500 bytes, 1 kilobyte, 1.5 kilobytes, etc. In some embodiments, the average communication size may be initialized to a value based on historical information (e.g., based on experience from working with the system), and then adjusted over time to a value computed based on the current operating environment as described above. In some embodiments, the average communication size may be computed and maintained separately for different classes of devices, such as, e.g., servers, desktops, laptops, and mobile devices.

In some embodiments, the server 101 communicates with remote devices 108a-108n via a communication channel 105. The communication channel 105 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The communication channel 105 standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA.

In some embodiments, different types of data may be transmitted via different links and standards. In other embodiments, the same types of data may be transmitted via different links and standards.

The communication channel 105 may be any type and/or form of network. The geographical scope of the communication channel 105 may vary widely and the communication channel 105 can be a body area network (BAN), a personal area network (PAN), a local-area network (LAN), e.g. Intranet, a metropolitan area network (MAN), a wide area network (WAN), or the Internet. The topology of the communication channel 105 may be of any form and may include, e.g., any of the following: point-to-point, bus, star, ring, mesh, or tree. The communication channel 105 may be an overlay network which is virtual and sits on top of one or more layers of other networks. The communication channel 105 may include any such network topology as known to those ordinarily skilled in the art capable of supporting the operations described herein. The communication channel 105 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The communication channel 105 may be a type of a broadcast network, a telecommunications network, a data communication network, or a computer network.

The remote device 108a-108n may include, e.g., a computing device, desktop computer, portable computer, laptop, notebook computer, smartphone, personal digital assistant ("PDA"), tablet computer, electronic book reader, point of sale system, mainframe computer, rack mount server, workstation, turnkey system, thin client machine, virtual machine, embedded system, process controller, dedicated server, shared server, file server, application server, web server, proxy server, appliance, network appliance, gateway, gateway server, virtualization server, deployment server, SSL VPN server, firewall, etc. In some embodiments, a remote device 108a-108n may operate according to any type of operating system platform (e.g., WINDOWS NT, manufactured by Microsoft Corp. of Redmond, Wash., Unix, Linux, Mac OS or iOS, both manufactured by Apple Computer Corp. of Cupertino, Calif., Chrome OS or Android, both manufactured by Google Corp. of Mountain View, Calif.). In some embodiments, a remote device 108a-108n may operate with or without external storage. In some embodiments, a remote device 108a-108n may operate with or without a display. In some embodiments, a remote device 108a-108n may operate with or without user input devices. In some embodiments, a remote device 108a-108n may operate with constant network connectivity or with intermittent network connectivity. In some embodiments, a remote device 108a-108n may be a server class machine.

In some embodiments, each remote device 108a-108n includes a connection module 109 designed and constructed to initiate a connection and receive or otherwise facilitate a transmission of a timer period and timer offset. The connection module 109 may comprise of various hardware and/or software components including, e.g., an application, program, library, script, service, process, task or any other type and form of executable instructions executing on the remote device 108a-108n.

In some embodiments, each remote device 108a-108n includes a timer module 112 designed and constructed to trigger or otherwise facilitate the initiation of a connection with a period controlled by a timer period and an offset controlled by a timer offset. The timer module 112 may comprise of various hardware and/or software components including, e.g., an application, program, library, script, service, process, task or any other type and form of executable instructions executing on the remote device 108a-108n.

The server 101 may include a scheduling module 103 that computes a separate period and offset 104a-104n for each remote device 108a-108n. The period and offset 104a for a single remote device 108a is transmitted to that remote device through the communication channel 105 and stored locally 110. This is repeated for the other periods and offsets 104b-104n for the other remote devices 108b-108n. In some embodiments, the server 101 may compute a single period and offset 104a-104n for all remote devices and transmit the single period and offset to the remote devices 108a-108n.

In some embodiments, the period and offset 110 received from the server 101 may be used to set up a timer period 111 and timer offset 113 that may control the timer module 112. The timer module 112 may generate a signal with a period corresponding to the timer period 111, and offset in time by the timer offset 113. This signal may be used to trigger the connection module 109, which in turn may initiate the connection from the remote device 108a to the server 101. This is repeated for all other remote devices 108b-108n.

Figure 2:
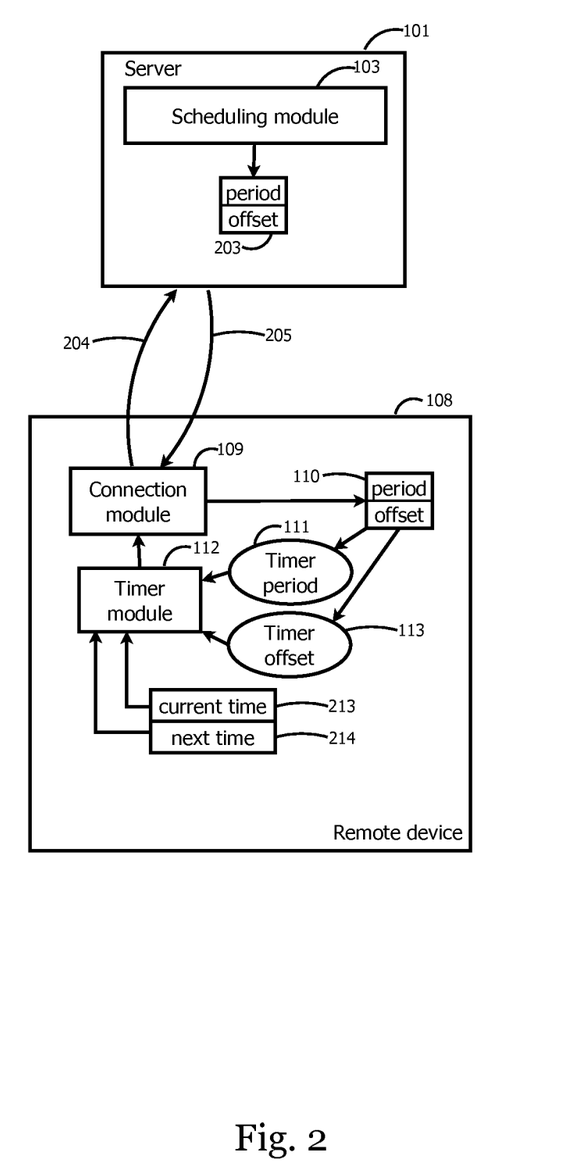
FIG. 2 is an illustrative block diagram of one embodiment of a transaction between a remote device and a server.

Referring now to FIG. 2, one embodiment of a transaction between a remote device 108 and a server 101 is shown. The remote device 108 may include a timer module 210. The timer module may be controlled by a timer period 211 and a timer offset 212, and may also maintain a current time 213 and/or next time 214. The current time 213 tracks the actual current real time in a given geographic location (e.g., Eastern Standard Time, Greenwich Mean Time, etc.). The next time 214 may be based, at least in part, on the timer period 211. For example, in an initial phase where the current time represents the first initiation connection, next time may correspond to the current time plus the timer period and/or timer offset. When the current time 213 reaches the next time 214 plus the timer offset 212, the timer module 210 may transmit a signal or otherwise indicate to and/or trigger the connection module 208 to initiate a connection 204 to the server 201. The next time 214 may then be incremented by the timer period 211. This may facilitate the timer module 210 initiating a connection 204 to the server 201 at regular intervals spaced apart by the timer period 211 and/or offset by the timer offset 212.

Upon triggering the connection module 208, the connection module 208 may initiate a polling request 204 to the server 201. Responsive to the polling request 204, the server 201 may respond with the period and offset 203 computed for the remote device 207. The remote device receives the period and offset 209, and uses it to set the timer period 211 and timer offset 212 that control the timer module 210. In this way, the server 201 may control the precise timing of the signal generated by the timer module 210, and may control the timing of the polling request 204 that received from the remote device 207.

Figure 3:
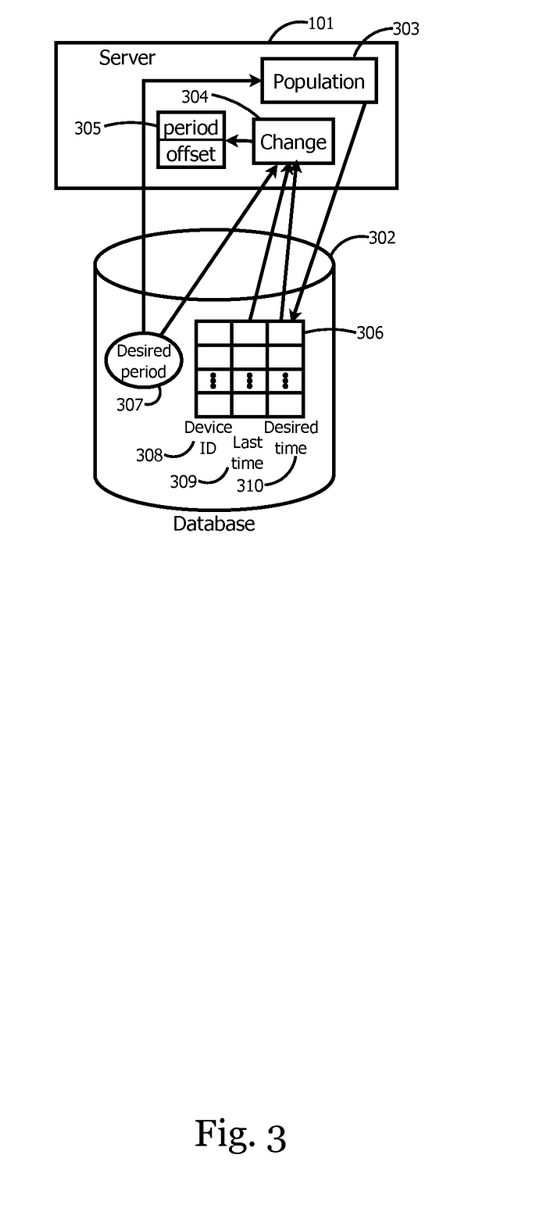
FIG. 3 is an illustrative block diagram of one embodiment of the computation of a period and offset to be provided to a remote device by a server.

Referring now to FIG. 3, an illustrative embodiment of the computation of a period and offset 305 to be provided to a remote device by a server 101 is shown. A database 302 may include information that can facilitate computation of the period and offset 305. The database may include, for example, a table 306 of timing information for each of the remote devices. For example, the table 306 may include columns representing a device ID 308 that uniquely identifies the remote device, a last time 309 that indicates the last time the remote device contacted the server 101, and/or a desired time 310 that may indicate the next time the remote device may be scheduled to contact the server 101. The database may also include the desired period 307, which may indicate an optimal or other desired period for remote devices to contact the server 101. In one embodiment, this desired period 307 is set to a nominal value that is constrained to a minimum interval based on the bandwidth of the communication channel and the number of devices. The server 101 may count or otherwise identify the number of remote devices in database 302, and either discover or identify the bandwidth of the communication channel or retrieve it as a configuration parameter from a database. The minimum value of the desired period 307 may be computed in a way to avoid saturating the bandwidth of the communication channel. In an illustrative example, the channel bandwidth may be 1 Mb/second, each communication may have an average data size of 500 bytes, and there may be 10,000 remote devices. The channel capacity may be computed by dividing 1,000,000 by 8 to get the channel capacity in bytes/second of 125,000. The load on the channel may be computed by multiplying the number of devices by the average communication size to get the load on the channel of 5,000,000 bytes per update cycle. The minimum time period may be computed by dividing the load on the channel by the channel capacity; e.g., 5,000,000 by 125,000 results in a minimum time period of 40 seconds. The server 101 may be configured to set a longer desired period 307, but the minimum timer period in this example embodiment may be 40 seconds.

The desired period 307, which may correspond to a minimum timer period or a longer timer period, may be used by a population module 303 to compute the optimal pattern for the timing of polling requests by all of the remote devices. The population module 303 may update the desired time column 310 in the database table 306 to reflect the results of that computation. In one embodiment, this computation includes divides the desired period 307 by the number of remote devices, then sets the desired time 310 to the current time plus a series of integral multiples of the result of that division. Further to the above example embodiment, the desired period 307 of 40 seconds may be divided by the number of remote devices 10,000, resulting in 4 mSec. The desired time 310 may then be set to the current time for the first remote device, the current time plus 4 mSec for the second remote device, the current time plus 8 mSec for the third remote device, and so on.

In some embodiments, a change module 304 may identify a period and offset 305 for a remote device. For example, the change module 304 may use the desired period 307 for the period, and compute the offset for the remote device as the difference between the desired time 310 and the sum of the last time 309 and the period 307. In this way, when the period and offset 305 are applied to the timer module on the remote device, the parameters may be set to cause the remote device to poll the server 101 at the correct desired time 310.

In some embodiments, one or more devices may have a shorter timer period than one or more other devices. For example, one or more devices may be assigned a higher priority and one or more other devices may be assigned a lower priority. Priority may be a parameter setting, predetermined configuration, or may be identified and/or determined in real-time responsive to a usage and/or functionality of the remote device. For example, if the device is currently performing emergency-related functionality (e.g., first responder), the device may receive a higher priority. In another example, an application on the remote device may be actively performing a function that may benefit from more frequent polling and/or connections.

In some embodiments, the system may provide and/or account for heterogeneous periods in various ways. For example, based on the computed minimum period and/or desired period, the system may offset every high priority device with a low priority device. For example, a high priority device may be assigned with a period that is a fraction of the desired period (e.g., T/2, T/3, T/4, T/5, etc.) while a corresponding low priority or non-high priority device may be assigned a period such that the overall network capacity does not exceed the maximum bandwidth (e.g., 2T, 3T, 4T, 5T). In one embodiment, devices may be assigned a priority value, where a value of 1 is "normal" and larger values indicate a higher priority. When counting the number of devices to compute the load on the channel in bytes/update cycle, the count is computed as the sum of the priorities of the devices. The timer period for each device is divided by its priority in a final step. The timer offset computation is modified by delaying lower priority devices slightly to allow higher priority devices to initiate a connection more frequently.

Figure 4:
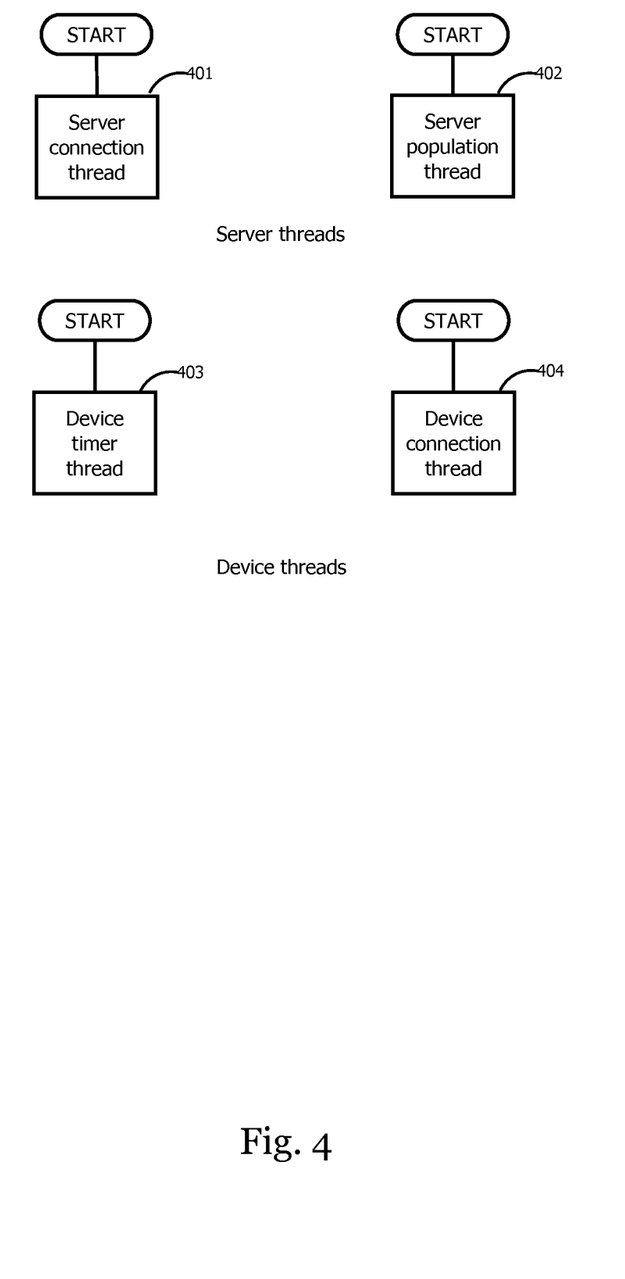
FIG. 4 is an illustrative flowchart depicting one embodiment of a method for providing periodic access to a server by one or more remote devices.

Referring now to FIG. 4, an illustrative flowchart of one embodiment of a method for providing periodic access to a server by one or more remote devices is shown. The operation may be divided into multiple concurrent and/or sequential threads of execution. One or more threads of execution may be executed on a single-core processor, multi-core processor, multiple processors or multiple servers and/or remote devices. For example, the server may execute two threads, the server connection thread 401 and the server population thread 402. A device may execute two threads, the device timer thread 403, and the device connection thread 404. In some embodiments, the server may execute one or more threads and transmit information to a remote devices, while in other embodiments, remote devices may execute one or more threads and transmit information to a server. These threads are described more fully in additional figures.

Figure 5:
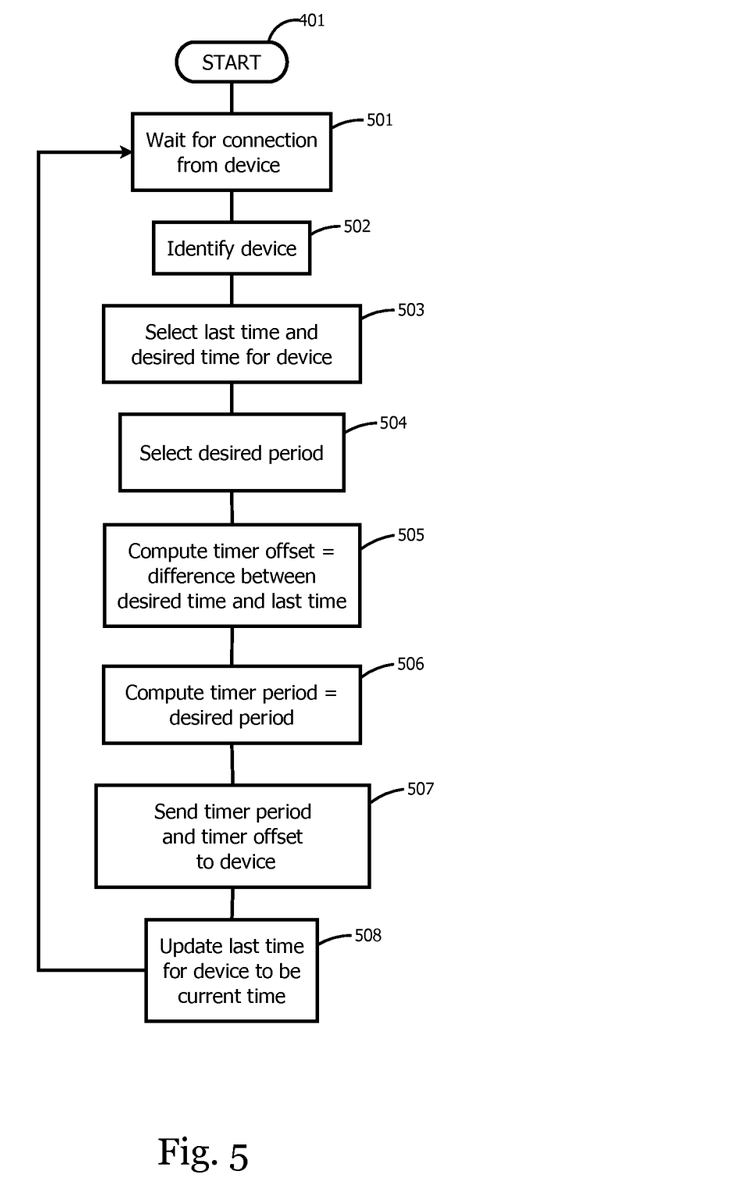
FIG. 5 is an illustrative flowchart depicting one embodiment of the steps taken by the server connection thread.

Referring now to FIG. 5, a flowchart of one embodiment of the server connection thread is shown. In some embodiments, at step 501, the thread waits for a connection from a device. Upon making the connection, at step 502, the thread may identify the device using information in the connection data. At step 503, the last time and desired time for the device may be selected from a database. At step 504, the overall desired period may be selected from the database. At step 505, the thread may include computing the timer offset as the difference between the desired time and the last time for the device. At step 506, and the thread may compute the timer period as equal to the desired period. At step 507, the thread may include transmitting or otherwise conveying the timer period and timer offset to a device. At step 508, the thread may include updating the last time for the device in the database to be the current time, and proceeding to wait 501 for another connection. One or more steps may be performed by one or more threads executing on one or more processors or processing cores.

Figure 6:
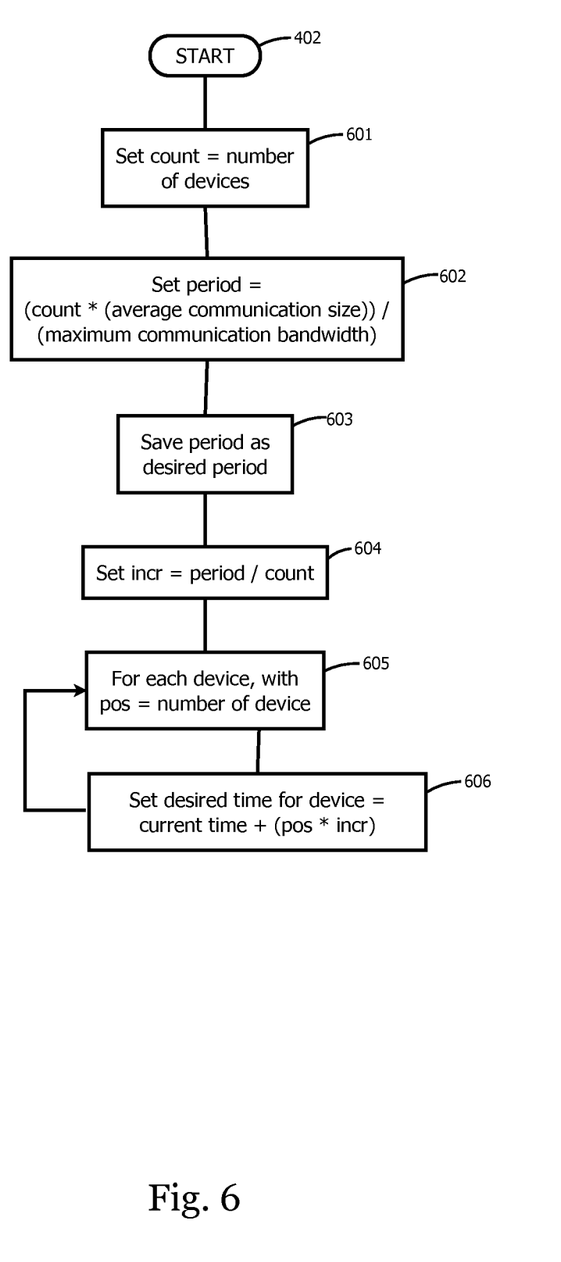
FIG. 6 is an illustrative flowchart depicting one embodiment of the steps taken by the server population thread.

Referring now to FIG. 6, an illustrative example of a flowchart of one embodiment of the server population thread is shown. In some embodiments, the server population thread may run at regular intervals to update the per-device data in the database, and/or when a device is added to or removed from the database. In some embodiments, at step 601, the number of devices in the database is counted. At step 602, a thread may include computing the period in seconds for connections as the device count multiplied by the average communication size in bytes, divided by the maximum bandwidth of the communication channel in bytes per second. At step 603, the result of the computation may be saved in the database as the desired period. At step 604, a thread may include computing an increment as the desired period divided by the number of devices. At step 605, the server population thread may loop through two or more devices 605. At step 606, the server population thread may set the desired time for the device to the current time added to the increment multiplied by the number of the device in the loop.

Figure 7:
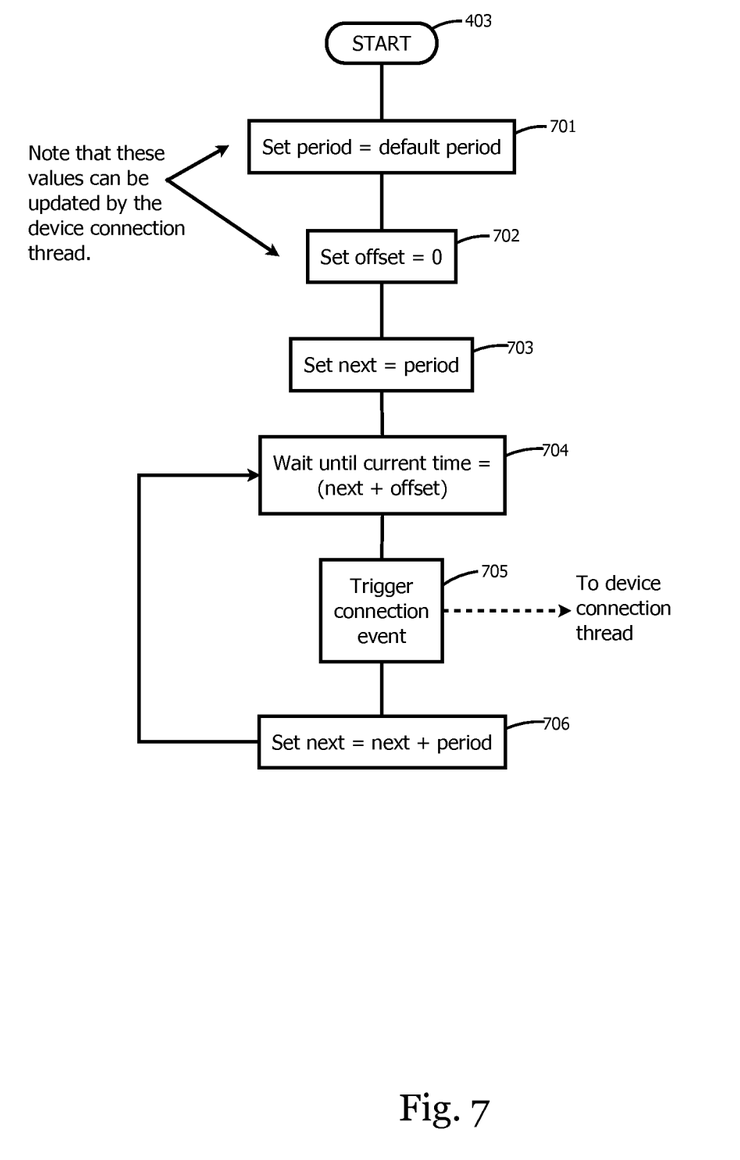
FIG. 7 is an illustrative flowchart depicting one embodiment of the steps taken by the device timer thread.

Referring now to FIG. 7, a flowchart of one embodiment of the device timer thread is shown. In some embodiments, at step 701, the thread may include initializing the period by setting the period to a default value. At step 702, the thread may include initializing the offset by setting the offset to zero. At step 703, the thread may include initializing the next time by and setting the next time to the period. At step 704, the thread may include waiting until the current time equals the next time plus the offset. At step 705, the thread may include triggering a connection event in the device connection thread. At step 705, the thread may include updating the next time by adding the period to it, and proceeding to the waiting step 704.

In some embodiments, the server 101 may receive an initiation connection from a remote device outside a designated tolerance window. Upon identifying that the connection was received outside a tolerance window, the server 101 may assign, to the remote device transmitting the connection, a status of offline. In some embodiments, the tolerance window may be a fixed time value. In some embodiments, the tolerance window may be computed for each device as a multiple of the latency of the connection of the device, as measured by the difference between a timestamp inserted in the data by the device, and the time of receiving the data measured at the server 101. In some embodiments, the tolerance window may be set to a single value that is a multiple of the maximum latency of any device, where the latency is measured by the difference between a timestamp inserted in the data by the device, and the time of receiving the data measured at the server 101. In some embodiments, the offline status of a device may be stored in the database 302. In some embodiments, the offline status of a device may be displayed to an end user who may use it to monitor the status of devices. In some embodiments, the offline status of a device may be used to trigger an alert to bring the attention of an end user to investigate the offline status. In some embodiments, the offline status of a device may be cleared (changed back to online) manually by an end user. In some embodiments, the offline status of a device may be cleared (changed back to online) automatically when the device connects to the server 101 again.

Figure 8:
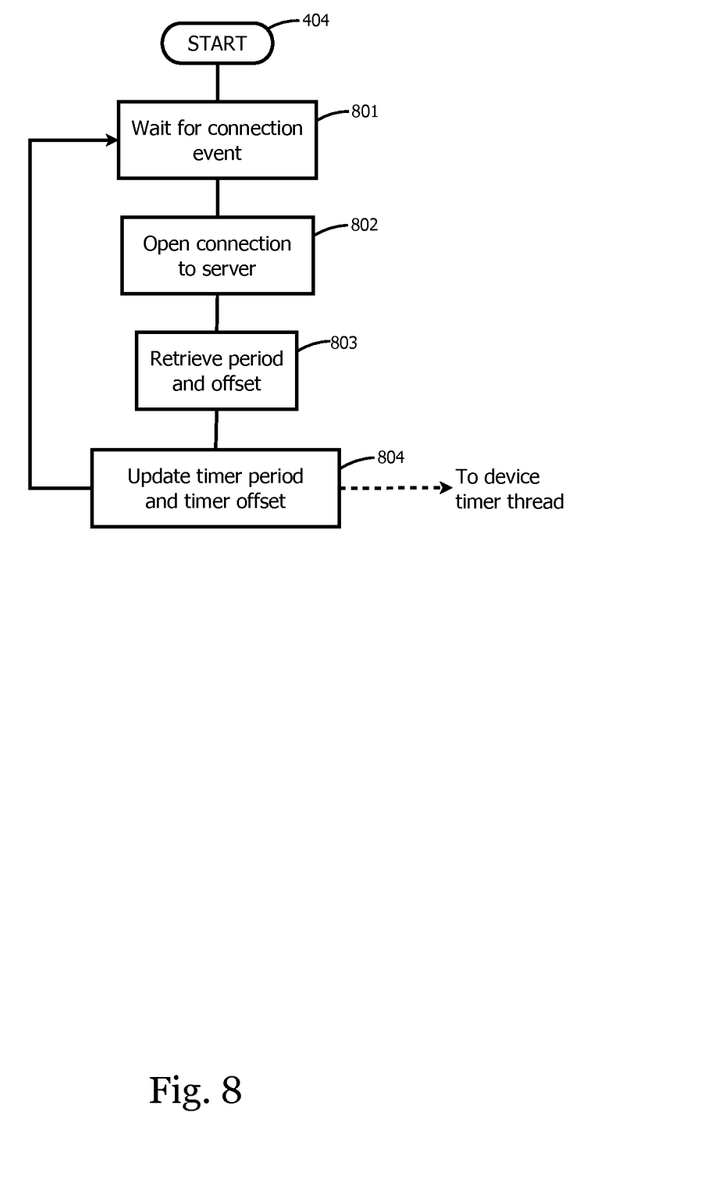
FIG. 8 is an illustrative flowchart depicting one embodiment of the steps taken by the device connection thread.

Referring now to FIG. 8, a flowchart of one embodiment of the device connection thread is shown. In some embodiments, at step 801, the thread includes waiting for a connection event. When such an event is triggered, at step 802, the thread may open and/or initiate a connection to the server. At step 803, the device may receive and/or retrieve a period and/or offset. At step 804, the thread may include updating the timer period and timer offset with these values in the device timer thread. The thread may then proceed to the waiting step 801.

There are many practical and operational refinements to the present invention that arise in actual use. These refinements are apparent to one skilled in the art, but have not been described in the detailed embodiments above. Some of these refinements are listed here as examples. This is not a comprehensive list but is intended to demonstrate additional aspects of the power and flexibility of the invention.

In some embodiments, the control values for the timer module are increments rather than absolute values. In this way, the system can operate even if the server and remote devices do not have synchronized clocks.

In some embodiments, the system adapts dynamically when the configuration changes. In an example embodiment meant to be illustrative, if the number of remote devices suddenly doubles, the scheduling module computes a new set of desired times taking this into account, and sends it to the remote devices within the next timer period.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for virtualizing audio hardware for one or more virtual machines, it will now become apparent to one of skill in the art that other embodiments incorporating the concepts of the disclosure may be used.

What is claimed is:

1. A system for providing access to a server by a plurality of remote devices, comprising:
   a first remote device of the plurality of remote devices, the first remote device comprising one or more processors executing instructions stored in memory of the first remote device, a first connection module stored in the memory of the first remote device, and a first timer module stored in the memory of the first remote device;
   a second remote device of the plurality of remote devices, the second remote device comprising one or more processors executing instructions stored in memory of the second remote device, a second connection module stored in the memory of the second remote device, and a second timer module stored in the memory of the second remote device;
   the server having one or more processors and memory;
   the first connection module, of the first remote device, initiates, at a first connection time, a first connection from the first remote device to the server and receives, responsive to initiation by the first remote device, a timer period and a first timer offset;
   a second connection module, of the second remote device, initiates, at a second connection time, a second connection from the second remote device to the server and receives, responsive to initiation by the second remote device, the timer period and a second timer offset different from the first timer offset;
   the first timer module, of the first remote device, determines a first next connection time based on a first summation of the first connection time of the first connection, the timer period and the first timer offset, and controls the first connection module to initiate a third connection with the server at the first next connection time; and
   a second timer module, of the second remote device, determines a second next connection time based on a second summation of the second connection time of the second connection, the timer period and the second timer offset, and controls the second connection module to initiate a fourth connection with the server at the second next connection time,
   wherein the timer period and the first timer offset and the second timer offset are computed to evenly distribute initiation of connections by the plurality of remote devices.

2. The system of claim 1, wherein the timer period and the first timer offset avoid exceeding the maximum bandwidth of the communication channel between the first remote device and the server.

3. The system of claim 1, wherein the timer period for the first remote device is based on an identity of the first remote device.

4. The system of claim 1, wherein the first remote device is assigned an offline status responsive to failing to initiate a fifth connection within a tolerance window corresponding to the timer period and the first timer offset.

5. A method of accessing a server by a plurality of remote devices, comprising:
   initiating, by a first connection module in memory of a first remote device comprising a processor, at a first connection time, a first connection to the server;
   receiving, responsive to initiation of the first connection by the first remote device, via the first connection from the server, a timer period and a first timer offset;
   initiating, by a second connection module in memory of a second remote device, at a second connection time, a second connection to the server;
   receiving, responsive to initiation of the second connection by the second remote device, from the server, the timer period and a second timer offset different from the first timer offset;
   determining, by a first timer module of the first remote device, a first next connection time based on a first summation of the first connection time of the first connection, the timer period, and the first timer offset;
   determining, by a second timer module of the second remote device, a second next connection time based on a second summation of the second connection time of the second connection, the timer period, and the second timer offset;
   initiating, by the first connection module at the first next connection time, a third connection to the server;
   and initiating, by the second connection module at the second next connection time, a fourth connection to the server,
   wherein the timer period and the first timer offset and the second timer offset are computed to evenly distribute initiation of connections by the plurality of remote devices.

6. The method of claim 5, further comprising:
selecting, by the server, the timer period and the first timer offset to avoid exceeding a maximum bandwidth of a communication channel between the plurality of remote devices and the server.

7. The method of claim 5, further comprising:
selecting, by the server, the timer period for the first remote device based on an identity of the first remote device.

8. The method of claim 5, further comprising:
assigning an offline status to the first remote device responsive to the first remote device failing to initiate a fifth connection within a tolerance of time indicated by the timer period and the first timer offset.

9. A system for providing access to a server by a plurality of remote devices, comprising:
a server having one or more processors executing instructions stored in memory to:
compute a timer period and a first timer offset for a first remote device of the plurality of remote devices;
compute the timer period and a second timer offset for a second remote device of the plurality of remote devices, the second timer offset different from the first timer offset, wherein the timer period and the first timer offset and the second timer offset are computed to facilitate evenly distributing initiation of connections by the plurality of remote devices;
transmit, responsive to receiving, at a first time, a first initiation connection from the first remote device, the timer period and the first timer offset to the first remote device;
transmit, responsive to receiving, at a second time, a second initiation connection from the second remote device of the plurality of remote devices;
receive, at a third time based on the timer period and the first timer offset added to the first time, a third initiation connection from the first remote device; and
receive, at a fourth time based on the timer period and the second timer offset added to the second time, a fourth initiation connection from the second remote device.

10. The system of claim 9, wherein the server further:
computes the timer period and the first timer offset based, at least in part, on a maximum bandwidth of a communication channel between the plurality of remote devices and the server.

11. The system of claim 9, wherein the server further:
computes the timer period for the first remote device based on an identity of the first remote device.

12. The system of claim 9, wherein the server further:
assigns, to the first remote device, an offline status responsive to receiving a request to initiate a connection outside a tolerance window corresponding to the timer period and the first timer offset.

13. A method of accessing a server by a plurality of remote devices, comprising:
computing, by a scheduling module in memory of the server comprising one or more processors, a timer period and a first timer offset for a first remote device;
computing, by the scheduling module, the timer period and a second timer offset for a second remote device, the second timer offset different from the first timer offset, wherein the timer period and the first timer offset and the second timer offset are computed to facilitate evenly distributing initiation of connections by a plurality of remote devices comprising the first remote device and the second remote device;
transmitting, by the server responsive to receiving a first initiation connection from the first remote device at a first time, the timer period and the first timer offset to the first remote device;
transmitting, by the server responsive to receiving a second initiation connection from the second remote device at a second time, the timer period and the second timer offset to the second remote device;
receiving, by the server from the first remote device, at a third time based on the timer period and the first timer offset added to the first time, a third initiation connection; receiving, by the server from the second remote device, at a fourth time based on the timer period and the second timer offset added to the second time, a fourth initiation connection.

14. The method of claim 13, further comprising:
computing the timer period and the first timer offset based, at least in part, on a maximum bandwidth of a communication channel between the plurality of remote devices and the server.

15. The method of claim 13, further comprising:
computing the timer period for the first remote device of as a function of an identity of the first remote device.

16. The method of claim 13, further comprising:
receiving, by the server, a request to initiate a connection from the first remote device;
identifying, by the server, that the request to initiate the connection was received outside a tolerance window corresponding to the timer period and the first timer offset; and
determining, by the server, responsive to the identification, that a status of the first remote device is offline.

* * * * *